United States Patent [19]

Hanson

[11] 4,037,944
[45] July 26, 1977

[54] LOW STRESS OPTICAL MOUNTING STRUCTURE AND METHOD

[75] Inventor: Richard A. Hanson, Concord, Calif.

[73] Assignee: Systron Donner Corporation, Concord, Calif.

[21] Appl. No.: 651,721

[22] Filed: Jan. 23, 1976

[51] Int. Cl.² ............................................. G02B 5/08
[52] U.S. Cl. ................................... 350/310; 350/288; 350/320
[58] Field of Search ............... 350/107, 288, 310, 320; 248/466

[56] References Cited

U.S. PATENT DOCUMENTS 3,843,236   10/1974   Kurz, Jr. .............................. 350/288

Primary Examiner—F. L. Evans
Attorney, Agent, or Firm—Flehr, Hohbach, Test, Albritton & Herbert

[57] ABSTRACT

Kinematic mounting of an optical mirror cube in an athermal system is obtained wherein the optical mirror cube has a mounting post extending from a support surface thereon. The mirror cube also has an optical surface and a registration surface. A mounting pedestal extends from a structural surface upon which the mirror cube is fastened. The mounting pedestal has a mounting bore formed therein passing through a pedestal support surface for contacting the mirror cube support surface. The bore is formed to loosely receive the mounting post and a pedestal registration surface is provided for matching the mirror cube registration surface. The pedestal has a pair of lateral bores therethrough formed to intersect the mounting bore at substantially right angles. The mounting post has a pair of lateral bores therethrough with axes aligned with the lateral pedestal bores. A filler material having desirable compression strength qualities is disposed between the mounting bore and the mounting post extending into the lateral bores, and is cured while the pedestal and mirror cube registration surfaces are in contact.

14 Claims, 4 Drawing Figures

U.S. Patent        July 26, 1977        4,037,944
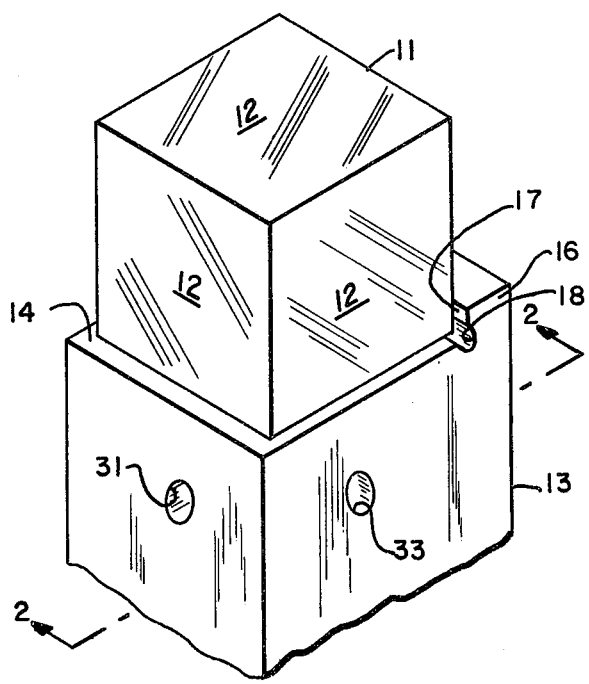
FIG.—1
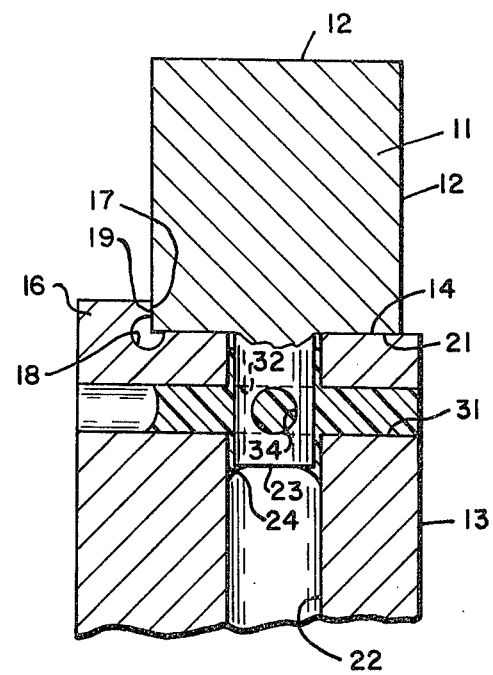
FIG.—2
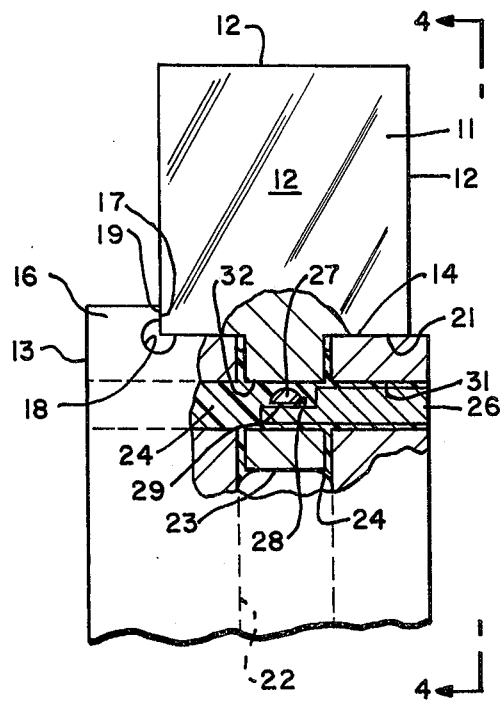
FIG.—3
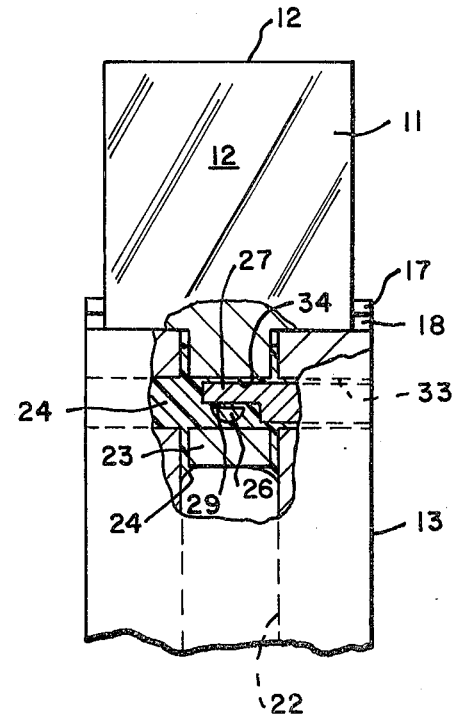
FIG.—4

4,037,944

LOW STRESS OPTICAL MOUNTING STRUCTURE AND METHOD

BACKGROUND OF THE INVENTION

This invention relates to a rigid and positive locating optical element mounting, and more particularly to such an optical element mounting which does not undergo stress or relative motion between the parts therein either with exposure to a predetermined range of temperature variation or when the surface upon which the mounting system is attached undergoes stress.

Optical systems operate in a realm of precision that is generally several orders of magnitude more severe than usual mechanical tolerances. Standard units of optical measure are related to the wave length of light, with 0.5 micrometers being a typical light wave length. Good optical systems are measured for optical performance in terms of fractions of a wave length of light, and may therefore be seen to be tightly toleranced. Angular orientations in a good optical system are held to a few arc seconds. The critical problem is to position optical elements to the required tolerances without deforming them by imparting stresses in the optical elements due to the mounting techniques. Once the initial stress free mounting is obtained the collateral problem of maintaining the optical alignment and optical surface geometry over wide ranges of mounting surface stress and temperature variation is encountered. It is desirable to obtain means for mounting optical elements which may be easily assembled in positive and rigid alignment and which thereafter will not be skewed from the original alignment by stress induced from any source.

SUMMARY AND OBJECTS OF THE INVENTION

A low stress optical system is mounted relative to a surface for carrying the system and includes an optical element having an element support surface. A mounting pedestal projects from the surface for carrying the optical system having a pedestal support surface contacting the optical element support surface. A mounting bore is formed in the mounting pedestal intersecting the pedestal support surface for loosely receiving a mounting post which extends from the element support surface. Means is provided for registration of the optical element so that it assumes a predetermined angular orientation about the axis of the mounting post. A filler is disposed between the mounting bore and the loosely received mounting post which is cured while the optical element is supported on the pedestal mounting surface and angularly oriented by the means for registration.

In general it is an object of the present invention to provide a rigidly supported and aligned optical element which is relatively free of internally induced stress and is substantially isolated from externally induced stress.

Another object of the present invention is to provide an optical assembly which is simply and positively aligned at assembly.

Another object of the present invention is to provide an optical system which maintains original alignment obtained at assembly despite thermal excursions.

Additional objects and features of the invention will appear from the following description in which the preferred embodiments have been set forth in detail in conjunction with the accompanying drawings.

BRIEF DESCRIPTION OF THE DRAWINGS

FIG. 1 is an isometric view of one embodiment of the disclosed invention.

FIG. 2 is a sectional view along the line 2—2 of FIG. 1.

FIG. 3 is a partially cut away side elevational view of another embodiment of the present invention.

FIG. 4 is a partially cut away view along the line 4—4 of FIG. 3.

DESCRIPTION OF THE PREFERRED EMBODIMENTS

In the language of optics and optical mounting an optical element is an individual unit such as a mirror or lens. A mirror is an optical element that reflects light and may be either flat for simple reflection or curved for either diffusing or focusing light rays. The discipline of mounting an optical element so that it is positively and rigidly located without stress or strain therein is termed kinematic mounting. An athermal optical system is an optical system which is totally unchanged by thermal shifts in the optical element or supporting structure therefore. Kinematic mounting of an athermal optical system is clearly an end sought which is never completely achieved. These terms are therefore used in that which follows in a comparative sense relative to the characteristics presently known to be achievable in this field.

Turning to FIG. 1, a kinematic mount for an athermal system is shown having an optical element in the form of mirror cube 11 having one or more optical reflecting surfaces 12. A pedestal support 13 has a pedestal support surface 14 thereon in contact with mirror cube 11 and an upwardly extending ledge 16 having a narrow registration surface 17 disposed for contacting mirror cube 11. Narrow registration surface 17 approaches the configuration of an edge so that the requirement for registration of broad flat conforming surfaces is avoided. A relief 18 is formed at the junction of the registration surface 16 and pedestal support surface 14. The mirror cube 11 may thereby be contacted by the aforementioned support and registration surfaces 14 and 17 on support pedestal 13 without contacting the corner of cube 11 thereby eliminating one possible source of mounting stress.

Turning to FIG. 2, mirror cube 11 is seen to have an optical element registration surface 19 and an optical element support surface 21. Optical element registration surface 19 contacts narrow registration surface 17 on support pedestal 13 and optical element support surface 21 contacts pedestal support surface 14 on support pedestal 13. A bore 22 is formed in support pedestal 13 and a mounting post 23 is shown attached to and extending from mirror cube 11. Mounting post 23 fits loosely in bore 22 leaving a space therebetween in which a filler material 24 is disposed. When mounting post 23 is centrally located in bore 22, filler material 24 is ideally disposed to form a film of uniform thickness around mounting post 23 and bore 22 and lying therebetween. Filler material 24 is selected to have substantial compression strength characteristics and reasonably good shear strength characteristics.

The method of kinematic mounting for an athermal optical system involves assembling mirror cube 11 to support post 23. This may be achieved by machining mirror cube 11 and support post 23 from the same block of material, such as 440 stainless steel for example. Subsequent polishing of the reflecting surfaces 12 and formation of support surface 21 and registration surface 19 is undertaken. While it is preferred that mirror cube 11 and support post 23 be formed as an integral part, it is also envisioned that mirror cube 11 could have a bore (not shown) therethrough aligned with mounting bore 22 and mounting post 23 would also be loosely received therein. Disposition of filler material 24 between the bore in mirror cube 11 and mounting post 23 is then achieved at the same time filler material 24 is disposed in bore 22. Subsequent insertion of mounting post 23 in the mounting bore 22 and the bore (if present) in mirror cube 11 is undertaken so that a relatively uniform film of filler material 24 is disposed between mounting post 23 and mounting bore 22 and the bore in mirror cube 11. Registration of mirror cube 11 is achieved by placing registration surfaces 17 and 19 in contact and support surfaces 14 and 24 in contact. Thereafter the filler material 24 is cured at room temperature or at some nominal operating temperature while registration of mirror cube 11 is maintained.

A preferred form of the embodiment of FIGS. 1 and 2 has a lateral bore 31 formed in support pedestal 13 which intersects mounting bore 22. A lateral bore 32 is formed in mounting post 23 aligned with lateral bore 31. An additional lateral bore 33 is formed through support pedestal 13 which intersects mounting bore 22, and an additional lateral bore 34 through mounting post 23 is aligned with additional lateral bore 33. Filler material 24 is then deposited through lateral bores 31 and 33 in pedestal 13 until a circumference of mounting bore 22 is covered and mounting post 23 is inserted therein. While not mandatory, it is preferable if additional filler material 24 is deposited in lateral bores 31 and 33 so that lateral bores 32 and 34 through mounting post 23 contain filler material 24 and there are no voids therein. In the event the above described alternate mirror cube 11 and mounting post 23 assembly is undertaken where mirror cube 11 has a bore (not shown) therethrough, lateral bores in mirror cube 11 and mounting post 23 similar to 31/32 and 33/34 are preferably formed therein and assembly is achieved as for mounting post 23 in mounting bore 22 above. Filler material 24 is then cured at room temperature or some other nominal operating temperature as described above.

It should be noted here that mounting bore 22 is vented below lateral bores 31 and 33 so that excess filler material 24 deposited therein after mounting post 23 is inserted in mounting bore 22 will migrate toward the lower end of mounting bore 22. Filler material 24 is thereby prevented from reaching support surface 14 so that it is never in contact with either of support surfaces 14 or 21. This is necessary due to the gross mismatch usually existing between the temperature coefficients of expansion of filler material 24 and the material from which the other component parts of the mounting assembly are fabricated. The volume of filler material 24 in the assembly may be seen to be relatively symmetrical about one plane through the longitudinal axis of mounting bore 22 and the plane including the axes of the lateral bores 31 and 33. Consequently the temperature induced dimensional instability of filler material 24 results in internal stress therein producing a resultant force on mounting post 23 and the walls of mounting bore 22 which assumes a near zero level. Moreover, in this embodiment, adhesion strength of filler material 24, which is oftentimes low, at the surfaces of mounting bore 22 and mounting post 23 is not relied upon for retaining mounting post 23 axially in mounting bore 22. Shear strength of filler material 24 extending through bores 31/32 and 32/34 performs such axial retention. Since the other component parts of the assembly are fabricated from materials having similar temperature coefficients of expansion, substantial reduction of internal stress producing disfiguration of the optical element is obtained.

FIG. 3 shows another embodiment of the invention in which a pair of pins 26 and 27 have flats 28 and 29 respectively formed at the ends thereof. Lateral bore 31 in support pedestal 13 loosely receives pin 26. Lateral bore 32 in mounting post 23 aligned with lateral bore 31 also loosely receives pin 26. FIG. 4 shows additional lateral bore 33 through support pedestal 13 and additional lateral bore 34 through mounting post 23 aligned therewith loosely receiving pin 27. When pins 26 and 27 are inserted in bores 31/32 and 33/34 respectively, flats 28 and 29 are placed in juxtaposition within bores 32 and 34 as shown. Prior to insertion of pins 26 and 27, filler material 24 is injected into the ends of bores 31 and 33 to fill one end thereof and bores 32 and 34 in mounting post 23. The action of pins 26 and 27 as they're inserted into lateral bores 31/32 and 33/34 acts to remove probability of voids in filler material 24. The filler material thus injected into bores 31 and 33 is ideally disposed in a uniform film in the space between their corresponding bores and loosely fitting pins 26 and 27 upon their insertion therein. A room temperature cure of filler material 24 is undertaken as described above. In this fashion, mounting post 23 is axially fixed in bore 22 by the mechanical support provided by pins 26 and 27. Thus filler material 24 is relieved of the function of supporting shear stress therein due to any forces tending to displace mounting post 23 axially in bore 22. Symmetrical filler material volume is once again obtained, thereby producing near zero resultant force from internal stress due to temperature coefficient of expansion mismatch between the filler material 24 and the material of optical cube 11 and support pedestal 13 as described above. The embodiment of FIGS. 3 and 4 is the same as that of FIG. 1 above with the exception of the addition of pins 26 and 27.

The method of kinematic mounting for an athermal optical system in the embodiment of FIGS. 3 and 4 includes the steps recited for the embodiment of FIG. 1 above including injection of filler material into bores 31/32 and 33/34 as described above. Thereafter pins 26 and 27 are inserted in their respective bores 31/32 and 33/34 to extrude filler material 24 in a uniform film in the space provided by the loose fit therebetween. A uniform film is also formed between mounting post 23 and mounting bore 22 as well, with filler material 24 tending to migrate away from surfaces 14 and 21 due to the aforementioned venting of mounting bore 22. In this fashion voids in filler material 24 are avoided. Mounting post 23 is thereby fixed axially in bore 22 when the filler material is thereafter cured at room temperature as described in connection with the embodiment of FIG. 2 above.

The materials of mirror cube 11, mounting post 23 and support pedestal 13 are selected so that they have similar temperature coefficients of expansion. By way of example, all three of these elements may be formed of 440 stainless steel to provide structure functioning within the bounds of this disclosure. Since the filler material compression strength capabilities are considerable, the embodiment of FIG. 2 is useful primarily in those applications where stress force parallel to the longitudinal axis of bore 22 in mounting 23 will be held to moderate levels. When it is considered probable that stress forces in filler material 24 will be reached in excess of the shear stress capabilities of the filler material 24 or when a higher degree of dimensional stability is desired, the embodiment of FIGS. 3 and 4 is best utilized. The support pedestal 13 is adapted to be fastened to a surface (not shown) for carrying the optical assembly, and may be seen to substantially isolate the optical mirror cube 11 from stress which may be imposed in the surface. Support pedestal 13 has a height which is large relative to its base dimensions providing an elongate configuration in the height direction. The base dimensions are in contact with the surface for carrying the optical assembly. Therefore stress in that surface inducing flexural stress in the base of support pedestal 13 is largely isolated from optical mirror cube 11.

A stress free optical mounting assembly is obtained which is maintained in a stress free condition over a range of temperature variation. There is no dependence on the adhesion of the tensile strength properties of the filler material for maintaining alignment and no linear or angular movement of the optical element is induced by excursions within the temperature range. Simple alignment is provided for the optical element and structural stress isolation from the surface for carrying the optical system is provided.

What is claimed is:

1. A low stress optical system mounted relative to a mounting surface, comprising an optical element, an optical surface and an element support surface on said optical element, a mounting pedestal adapted to be attached to the mounting surface having a mounting bore therein, a pedestal support surface on said pedestal contacting said element support surface, a mounting post extending from said optical element and passing through said element and pedestal support surface and being loosely received in said mounting bore, said mounting post having a longitudinal axis extending substantially parallel to the axis of said mounting bore, means for registering said optical element relative to said mounting pedestal about said longitudinal axis, and a filler disposed between said mounting bore and said loosely received mounting post, whereby said optical element is positively and rigidly located relative to the mounting surface by said pedestal support surface and means for registering, and is substantially free of internally generated and externally induced stress.

2. A low stress optical system as in claim 1 wherein said mounting pedestal has a lateral bore therethrough intersecting said mounting bore, said mounting post having a lateral bore therethrough aligned with said lateral bore, and additional filler disposed in said lateral and lateral post bores, whereby said mounting post is retained axially in said mounting bore primarily by the shear strength of said filler.

3. A low stress optical system as in claim 1 wherein said mounting pedestal has a lateral bore therethrough intersecting said mounting bore, said mounting post having a lateral post bore therethrough aligned with said lateral bore, a pin loosely received in said lateral bore and lateral post bore, and additional filler disposed therebetween, whereby said filler and additional filler is substantially relieved of shear stress.

4. A low stress optical system as in claim 3 wherein said mounting pedestal has an additional lateral bore therethrough intersecting said mounting bore, said mounting post having an additional lateral post bore therethrough intersecting said lateral post bore and aligned with said additional lateral bore, said pin having a first flat thereon located within said lateral post bore, and an additional pin loosely received in said additional lateral bore and said additional lateral post bore, additional filler disposed therebetween, said additional pin having a second flat thereon in juxtaposition with said first flat.

5. A low stress optical system as in claim 1 wherein said means for registering comprises a registration surface on said optical element and means on said mounting pedestal contacting said registration surface.

6. A low stress optical system as in claim 5 wherein said means on said mounting pedestal is a narrow registration surface, thereby eliminating the second the need for contact between relatively large conforming registration surfaces.

7. A low stress optical system as in claim 1 wherein said mounting post is substantially centered in said mounting bore and said filler forms a substantially symmetrical volume around said longitudinal axis, whereby a temperature induced stress in said filler creates substantially zero resultant force on said mounting post, said temperature induces stress being contained by said mounting post and mounting bore, thereby leaving said optical element substantially free of temperature induced stress.

8. A stress isolated optical assembly mounted on a mounting surface for maintaining a predetermined optical alignment thereon, comprising a mirror having an optical reflecting surface, a mirror support surface and a registration surface, a mounting pedestal having a base attached to the mounting surface and having a mounting bore therein, a pedestal support surface on said mounting pedestal in contact with said mirror support surface, a pedestal registration surface on said mounting pedestal in contact with said registration surface, a mounting post extending through said pedestal support and mirror support surfaces and loosely fitting in said mounting bore, and a substantially uniform film of filler material between said mounting bore and said mounting post, said mirror, mounting pedestal and mounting post having similar temperature coefficients of expansion, whereby a substantially athermal mounting is obtained and said mirror is isolated from stress induced in the mounting surface.

9. A stress isolated optical assembly as claim 8 wherein said mounting pedestal has a first lateral pedestal bore intersecting said mounting bore, and said mounting post has a first lateral post bore therethrough aligned with said first lateral pedestal bore, a first pin loosely received by said first lateral pedestal and post bores, and additional filler disposed therebetween, whereby said substantially uniform film of filler material is relieved from supporting shear stress.

10. A stress isolated optical assembly as in claim 9 wherein said mounting pedestal has a second lateral pedestal bore intersecting said mounting bore, said mounting post has a second lateral post bore therethrough intersecting said first lateral post bore and aligned with said second lateral pedestal bore, a second pin loosely received by said second lateral pedestal and post bores, said additional filler being disposed therebetween, said first pin having a flat formed thereon disposed within said first lateral post bore, said second pin having a flat formed thereon in juxtaposition with said flat on said first pin, whereby shear stress is relieved in said filler material.

11. A stress isolated optical assembly as in claim 8 wherein said mounting pedestal has a lateral pedestal bore therein intersecting said mounting bore, said mounting post having a lateral post bore therethrough aligned with said lateral pedestal bore, and additional filler disposed to extend into said lateral pedestal and mounting post bores.

12. The method of mounting an optical element positioned relative to a surface to assume a minimal stress condition and to thereafter maintain the minimal stress condition both through changes of temperature over a predetermined temperature range and while stress is induced in the surface, comprising the steps of extending an elongate mount from the surface, boring a hole along the long axis of the mount, extending a member from the optical element, filling the hole with a filler having substantial strength in compression, fitting the member loosely in the hole, thereby filling the space between the member and the hole with the filler, registering the optical element for optical alignment with the surface, and curing the filler at room temperature while the optical element is registered.

13. The method of claim 12 together with the step of pinning the member axially in the bore prior to curing the filling material, whereby the filler is relieved from supporting shear stress.

14. The method of claim 12, together with the steps of boring an intersecting hole along a lateral axis of the mount, and extending the filler into the intersecting hole, whereby the optical element is retained by the shear strength of the filler.

* * * * *